(12) United States Patent
Belik

(10) Patent No.: US 8,869,974 B2
(45) Date of Patent: Oct. 28, 2014

(54) SPLICELESS BELT

(75) Inventor: Donald Ray Belik, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 171 days.

(21) Appl. No.: 13/553,939

(22) Filed: Jul. 20, 2012

(65) Prior Publication Data
US 2013/0240332 A1 Sep. 19, 2013

Related U.S. Application Data

(60) Provisional application No. 61/610,525, filed on Mar. 14, 2012.

(51) Int. Cl.
*B65G 15/34* (2006.01)
*B65G 15/30* (2006.01)

(52) U.S. Cl.
USPC ......................................................... 198/847

(58) Field of Classification Search
None
See application file for complete search history.

(56) References Cited

U.S. PATENT DOCUMENTS

| 2,590,697 | A | | 3/1952 | Grove | 51/297 |
| 4,253,836 | A | * | 3/1981 | Miranti, Jr. | 474/200 |
| 5,573,619 | A | | 11/1996 | Benedict et al. | 156/137 |
| 6,287,498 | B1 | * | 9/2001 | Schlueter et al. | 264/137 |
| 2008/0125263 | A1 | * | 5/2008 | Belik | 474/262 |

FOREIGN PATENT DOCUMENTS

| DE | 691 17 583 T2 | 5/1991 | B29D 30/70 |
| DE | 10 2009 003 588 B3 | 10/2010 | A01F 15/18 |

* cited by examiner

*Primary Examiner* — Kavel Singh
(74) *Attorney, Agent, or Firm* — Alvin T. Rockhill; Kathleen K. Bowen

(57) ABSTRACT

The present invention discloses an endless belt which is comprised of (1) a first reinforcement layer, wherein the first reinforcement layer is formed of a first fabric strip which is spirally wound forming a helix, and (2) a second reinforcement layer, wherein the second reinforcement layer is formed of a second fabric strip which is spirally wound forming a helix, wherein the second fabric strip is of essentially the same width as the first fabric strip, wherein the second fabric strip is parallel to the first fabric strip, and wherein the second fabric strip is offset from the first fabric strip.

20 Claims, 4 Drawing Sheets

SPLICELESS BELT

This application claims the benefit of U.S. Provisional Patent Application Ser. No. 61/610,525 filed on Mar. 14, 2012. The teachings of U.S. Provisional Patent Application Ser. No. 61/610,525 are incorporated herein by reference in their entirety.

FIELD OF THE INVENTION

The invention relates to fabric belts, and more particularly to rubber coated fabric belts, such as those used in agricultural applications.

BACKGROUND OF THE INVENTION

Crop baling machines typically utilize a moving elongated elastomeric belt to manipulate the crop in one or more ways. In the context of a round hay baler, one or more such elastomeric belts pass over and under a series of drive, idler, and tensioner rollers in a serpentine like arrangement. The belts function to take and form an incoming row of crop into a spiral roll of increasing diameter.

One problem with baler belts is that they typically are made of fabric that is spliced together. The splices can be a source of structural weakness in the belt. For instance, belt wear during service life frequently results in failure at the splice. This inherent problem associated with belts having spliced fabric reinforcements can be eliminated by utilizing a belt design that includes fabric reinforcements which are not spliced together as described in U.S. Pat. No. 2,590,697.

U.S. Pat. No. 5,573,619 describes a coated abrasive belt with an endless seamless backing. This belt includes a coated abrasive backing which consists of an endless, seamless, loop. The backing loop includes about 40% to 99% by weight of an organic polymeric binder, based upon the weight of the backing; and an effective amount of a fibrous reinforcing material engulfed within the organic polymeric binder material. The endless, seamless backing loop includes a length with parallel side edges, and at least one layer of fibrous reinforcing material engulfed within the organic polymeric binder material such that there are regions of organic binder material free of fibrous reinforcing material on opposite surfaces of the layer of fibrous reinforcing material. The fibrous reinforcing material can be in the form of individual fibrous strands, a fibrous mat structure, or a combination of thereof. A method for preparing the endless, seamless backing loop for a coated abrasive belt is described in U.S. Pat. No. 5,573,619. This method includes the steps of preparing a loop of liquid binder material having fibrous reinforcing material therein around the periphery of a drum; and solidifying the binder material such that an endless, seamless, backing loop having fibrous reinforcing material engulfed within the organic polymeric binder material is formed.

United States Patent Publication No. 2008/0125263 describes a spliceless baler belt which is an elastomeric belt comprised of one or more reinforcement layers, and one or more elastomeric layers, wherein at least one of the reinforcement layers is formed of strips that are spirally wound forming a helix. This belt design overcomes the problem associated with belt failure at splice points. However, the belts described in United States Patent Publication No. 2008/0125263 are somewhat lacking in other areas of durability, such as puncture resistance, which is important in agricultural applications. Accordingly, there is still currently a need for an endless, spliceless belt having improved durability including puncture resistance.

SUMMARY OF THE INVENTION

The endless, spliceless belts of this invention provide greatly improved durability, including puncture resistance, and service life over belts of prior designs. This is accomplished by including at least two layers of spirally wound fabric reinforcement in the belt with the fabric strips in the reinforcement layers being offset from each other. A third or even fourth fabric reinforcement layer can also be included with it being desirable for these additional layers to be at the opposite angle from that of the first and second fabric reinforcement layers. In the event that a fourth fabric reinforcement layer is included, the fabric strip therein will optimally be offset from the fabric strip in the third reinforcement layer by at least 10% of the width of the fabric strips in the third and forth reinforcement layers.

The present invention more specifically discloses an endless belt which is comprised of (1) a first reinforcement layer, wherein the first reinforcement layer is formed of a first fabric strip which is spirally wound forming a helix, and (2) a second reinforcement layer, wherein the second reinforcement layer is formed of a second fabric strip which is spirally wound forming a helix, wherein the second fabric strip is of essentially the same width as the first fabric strip, wherein the second fabric strip is parallel to the first fabric strip, and wherein the second fabric strip is offset from the first fabric strip.

The subject invention also reveals an endless elastomeric belt which is comprised of (1) an elastomeric layer, (2) a first reinforcement layer, wherein the first reinforcement layer is formed of a first fabric strip which is spirally wound forming a helix, and (3) a second reinforcement layer, wherein the second reinforcement layer is formed of a second fabric strip which is spirally wound forming a helix, wherein the second fabric strip is of essentially the same width as the first fabric strip, wherein the second fabric strip is parallel to the first fabric strip, and wherein the second fabric strip is offset from the first fabric strip by at least 10 percent the width of the first fabric strip.

The present invention further reveals an endless elastomeric belt which is comprised of (1) a first elastomeric layer which forms the bottom surface of the belt, (2) a second elastomeric layer which forms the top surface of the belt, (3) a first reinforcement layer which is situated between the first elastomeric layer and the second elastomeric layer, wherein the first reinforcement layer is formed of a first fabric strip which is spirally wound forming a helix, and (4) a second reinforcement layer which is situated between the first elastomeric layer and the second elastomeric layer, wherein the second reinforcement layer is formed of a second fabric strip which is spirally wound forming a helix, wherein the second fabric strip is of essentially the same width as the first fabric strip, wherein the second fabric strip is parallel to the first fabric strip, and wherein the second fabric strip is offset from the first fabric strip by at least 10 percent the width of the first fabric strip.

DETAILED DESCRIPTION OF THE INVENTION

Figure 1:
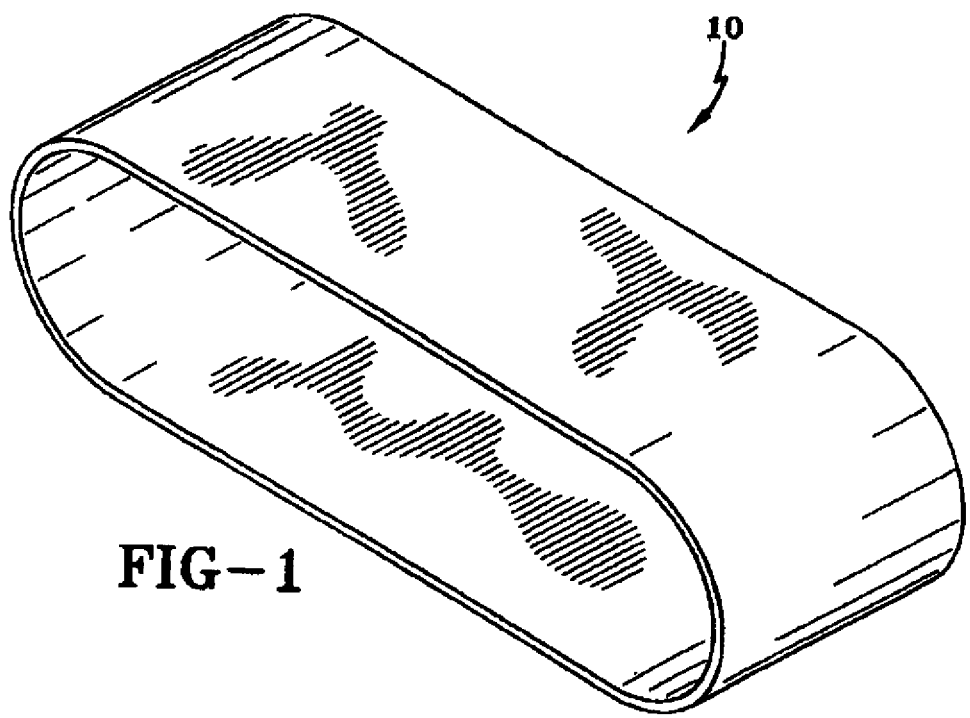
FIG. 1 is a perspective view of a baler belt.

FIG. 1 illustrates an endless belt 10 of the subject invention which is suitable for use as, a baler belt, a v-belt, a poly-v belt, synchronous belt or any belt used to convey material or transmit power. The endless belt 10 comprises an elastomeric body 10 that may be a unitary structure or may include a first layer 15 and a second layer 55 which are substantially parallel and composed of the same or different elastomeric and resilient materials. Representative of the elastomeric materials which may be used include thermosetting natural or synthetic rubbers, thermoplastic elastomers and urethanes.

Figure 2:
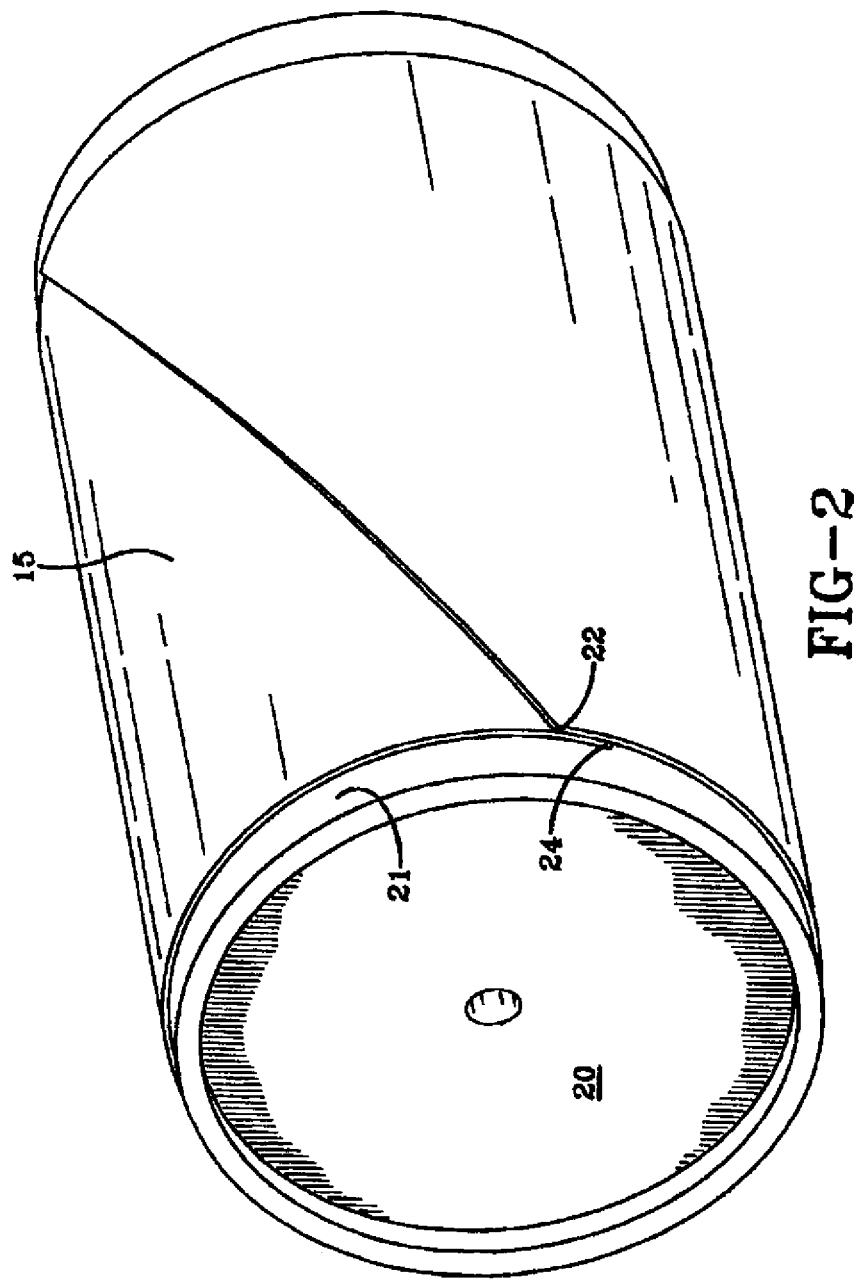
FIG. 2 is an illustration of an elastomeric layer wrapped around a mandrel.

As illustrated in FIG. 2, a first elastomeric layer 15 is wrapped around the outer circumferential surface 21 of a belt building mandrel 20 to from the bottom surface of the belt. The ends 22, 24 of the elastomeric layer 15 are then spliced together using a butt splice, lap splice or other splice known to those skilled in the art. The splice may be angled at any desired angle or be parallel to the mandrel longitudinal axis.

Figure 3:
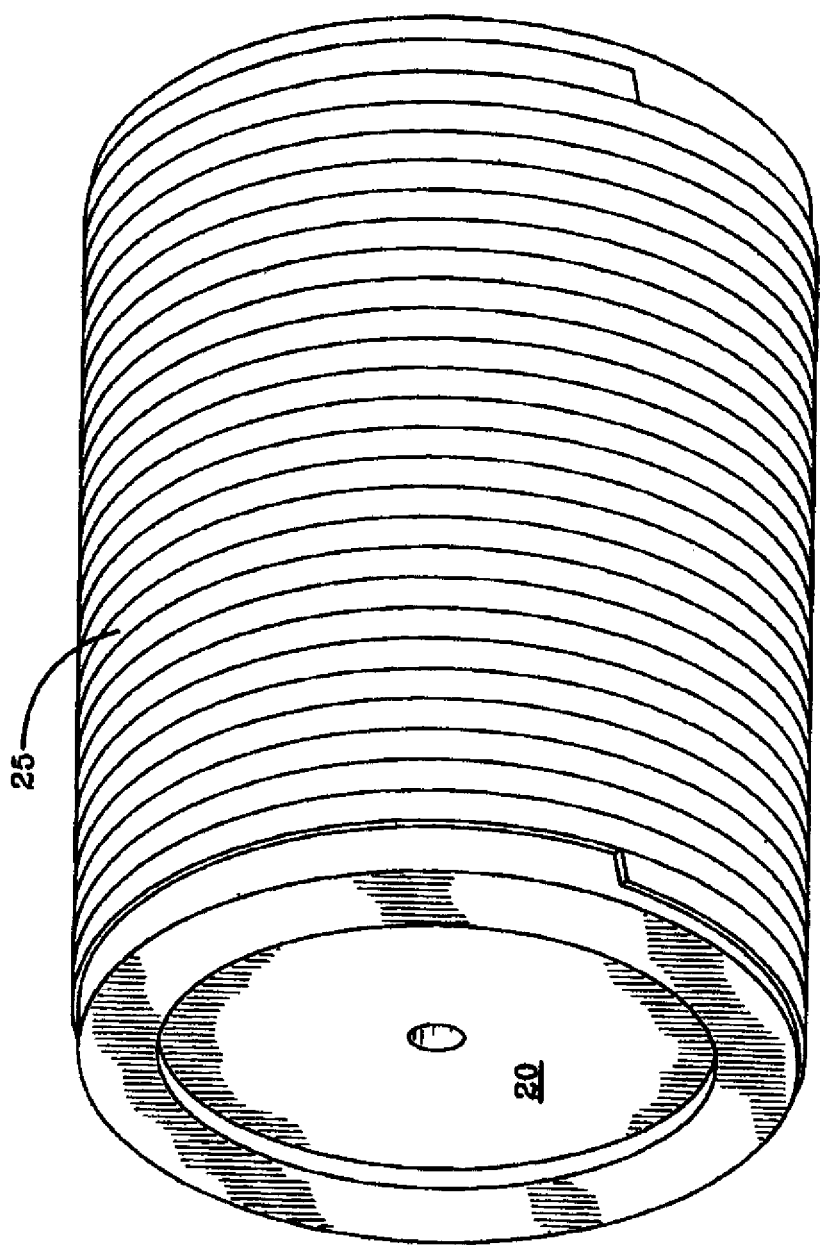
FIG. 3 is an illustration of a fabric layer being wrapped around a mandrel.

A first layer of fabric reinforcement is then applied to the mandrel over the first elastomeric layer 15. The first fabric reinforcement layer 25 may comprise any suitable material known to those skilled in the art such as polyester, nylon, Kevlar or aramid and/or rayon. The fabric can have any desired weave pattern or it can optionally be a non-woven fabric. The fabric reinforcement layer is comprised of a continuous fabric strip 25 which is spirally wound around the mandrel to form a continuous, endless helix. The angle of the helix is within about 15° or less. The angle of the helix is more typically within about 10° or less and is typically within the range of about 0.05° to about 8° and depends on the strip width and the length of the belt. The angle of the helix will frequently be within the range of 0.1° to about 6°. Such an endless reinforcement layer is shown in FIG. 3. The strips may be any desired width an will typically have a width which is within the range of 0.25 inch (6 mm) to 12 inches (305 mm) depending upon the overall size of the belt. The strips will frequently have a width which is within the range of about 0.5 inch (13 mm) to about 6 inches (152 mm). For instance the fabric strip can have a width of 0.5 inch (13 mm), 1 inch (25 mm), 2 inches (51 mm), 3 inches (76 mm), 4 inches (102 mm), or 5 inches (127 mm). The strips will typically be wound side-by-side so that there are no gaps between spiral winds as shown in FIG. 3.

A second fabric reinforcement layer 45, and any additional fabric reinforcement layers, may comprise any material suitable for use in the first fabric reinforcement layer. The fabric can have any desired weave pattern or it can optionally be a non-woven fabric. The second fabric reinforcement layer is comprised of a continuous fabric strip 45 which is spirally wound around the mandrel to form a continuous, endless helix.

Figure 4:
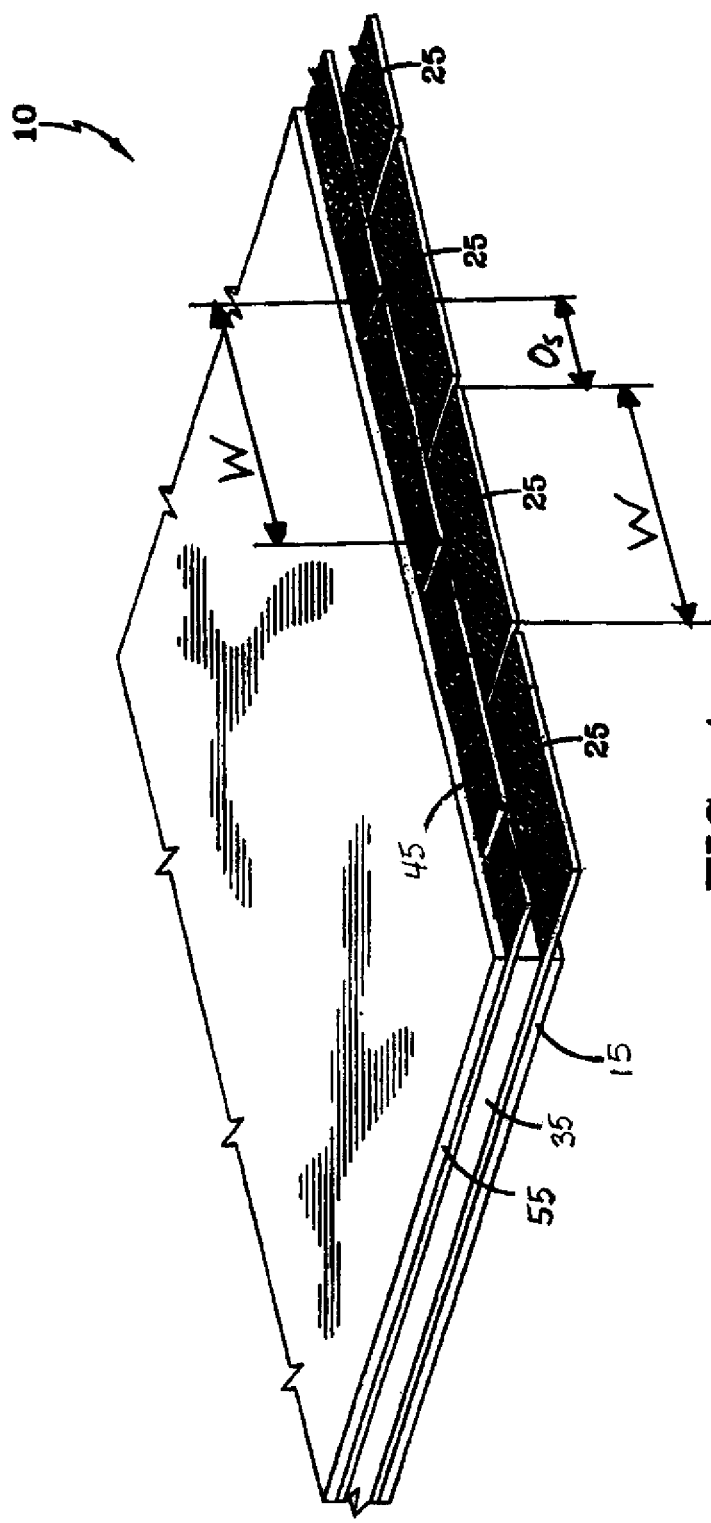
FIG. 4 is a cross-sectional view of the belt of the present invention.

The belt 10 may comprise additional elastomeric layers 35. However, it is not necessary for there to be an elastomeric layer between the fabric reinforcement layers. For instance, the first fabric reinforcement layer 25 and the second fabric reinforcement layer 45 can be adhered directly together with a suitable bonding agent or adhesive. In other words, an elastomeric layer can be situated between the first fabric layer and the second fabric layer or the first fabric layer and the second fabric layer can be bonded together by a bonding layer. In any case, the first fabric reinforcement layer 25 and the second fabric reinforcement layer 45 will be situated between the first elastomeric layer and the second elastomeric layer. It is important for the second fabric strip 45 to be essentially the same width as the first fabric strip 25 and for it to be spirally wound in the same direction and at essentially the same angle as is the first fabric strip 25. However, it is critical for the second fabric strip 45 in the second reinforcement layer to be offset from the first fabric strip 25 in the first reinforcement layer by a strip offset $O_s$ as illustrated in FIG. 4.

Typically, the second fabric strip 45 is offset from the first fabric strip 25 by at least 2 percent of the width W of the fabric strips. The second fabric strip 45 more typically is offset from the first fabric strip 25 by at least 5 percent and normally at least 10 percent of the width W of the fabric strips. In many cases the second fabric strip 45 will be offset from the first fabric strip by 20 percent to about 80 percent of the width W of the first fabric strip 25. More typically, the second fabric strip 45 is offset from the first fabric strip 25 by at least 30 percent to about 70 percent of the width W of the first fabric strip 25. In most cases it is preferred from the second fabric 45 strip to be offset from the first fabric strip 25 by at least 40 percent to about 60 percent of the width W of the first fabric strip 25. It is normally most preferred for the second fabric strip 45 to be offset from the first fabric strip 25 by at least 45 percent to about 55 percent of the width W of the first fabric strip 25.

The first fabric strip can optionally be comprised of two or more individual fractional strips which are helically wound side-by-side to form the first fabric strip. In such an event it is important for the second fabric strip to be offset from the first fabric strip in an amount whereby seams between the fractional strips do not align with seams in the helix of the second reinforcing layer. For instance, if the first fabric strip having a width W is comprised of two fractional strips which each have a width of ½ W the offset of the second fabric strip should not be 50 percent of the width W because this would result in the seams of the helix of the second fabric strip being in alignment with the seams between the fractional strips of the first reinforcement. In such a scenario the second fabric strip should be offset by some fraction of ½ W which will normally be at least 2 percent, typically at least 5 percent, and more typically at least 10 percent of ½ W. In the event that the first fabric strip is comprised of more that two fractional strips the offset will be some fraction of 1/n W wherein n represents the number of fractional strips used in making the first fabric strip. Thus, the offset will typically be at least 2 percent, more typically at least 5 percent, and most typically at least 10 percent of 1/n W. In such a scenario the second fabric strip will be offset from the first fabric strip by 20 percent to about 80 percent of the 1/n W. More typically, the second fabric strip will be offset from the first fabric strip by at least 30 percent to about 70 percent of 1/n W. In most cases it is preferred from the second fabric strip to be offset from the first fabric strip 40 percent to about 60 percent of 1/n W. It is normally most preferred for the second fabric strip to be offset from the first fabric strip by 45 percent to about 55 percent of 1/n W.

If additional fabric reinforcement layers are included in the belt to attain even better durability, the additional fabric reinforcement layers may also be spirally applied to the mandrel, preferably in the opposite direction of the first and second layers of reinforcement. For example, the first and second reinforcement layers may have a first angular orientation, e.g., being applied from left to right on the mandrel during the building process. The third reinforcement layer may have a second, different orientation, e.g., being applied from right to left. Applying the layers in this manner avoids the tendency of the belt to track towards the helix and more importantly provides it with greatly improved durability. In cases where a fourth reinforcement layer is included it will be also be wound in the direction of the third reinforcing layer, but the fabric strips therein will be offset from the fabric strips in the third reinforcement layer in that same manner as the strips and the first and second reinforcement layers. In cases where optional third and forth reinforcement layers are included it is not necessary for there layers to be arranged in the belt in any particular order. In other words, the second reinforcement layer can be applied over the first reinforcement layer with the third reinforcement layer being laid over the second reinforcement layer, and finally the fourth reinforcement layer being laid over the third reinforcement layer. In another scenario the third reinforcement layer can be applied over the first reinforcement layer with the second reinforcement layer being laid over the third reinforcement layer, and finally with the fourth reinforcement layer being laid over the second reinforcement layer. It should be understood that the belts of this invention can optionally include reinforcement layers in addition to those described heretofore. Tensile cord reinforcement can also optionally be used within the carcass body.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

An endless, spliceless belt can be manufactured by first wrapping a first elastomeric layer 15 around the outer circumferential surface 21 of a belt building mandrel 20 to from the bottom surface of the belt. A first layer of fabric reinforcement will then be applied to the mandrel over the first elastomeric layer 15. The first fabric reinforcement layer will be comprised of a continuous fabric strip 25 which is spirally wound around the mandrel to form a continuous, endless helix. The angle of the helix will be about 5°. An intermediate elastomeric layer 35 will then be applied to the mandrel over the first elastomeric layer 15. A second fabric reinforcement layer will then be applied to the mandrel over the intermediate elastomeric layer 35. The second fabric reinforcement layer will be comprised of a continuous fabric strip 45 which is spirally wound around the mandrel to form a continuous, endless helix. The angle of the helix will be about 5°. The second fabric strip 45 will be offset from the first fabric strip 25 by a distance of about 50 percent of the width W of the first fabric strip 25. A second elastomeric layer 55 will then be applied to the mandrel over the second fabric reinforcement layer. The belt will then be vulcanized to form a completed endless spliceless belt.

Example 2

An endless spliceless belt was manufactured utilizing the general procedure described in Example 1. The fabric strips used were 3 inches (76 mm) wide and the belt carcass has a thickness of 0.280 inches (7 mm). A second belt was made utilizing conventional technology for comparative purposes. In this comparative belt the fabric reinforcement was identical to the fabric used in making the experimental belt of this invention except that the second layer of fabric reinforcement was laid at the opposite angle from that of the first layer of fabric reinforcement. More specifically, the first layer of fabric reinforcement was applied at a left helix angle and the second layer of fabric was applied using a right helix angle. In all other respects the belts were identical.

The belts were then tested by driving a plunger into the cross-sectional area of the conventional belt where the right and left helix of fabric crossed. This testing showed that it took 613 lbs/in$^2$ (4.2 MPa) of force to drive the plunger through the belt. In comparative testing it took 4,300 lbs/in$^2$ (29.6 MPa) of force to drive the plunger through the belt made in accordance with this invention. Accordingly, the belt made in accordance with this invention offered much better puncture resistance than did the conventional belt.

While certain representative embodiments and details have been shown for the purpose of illustrating the subject invention, it will be apparent to those skilled in this art that various changes and modifications can be made therein without departing from the scope of the subject invention.

What is claimed is:

1. An endless belt which is comprised of (1) a first reinforcement layer, wherein the first reinforcement layer is formed of a first fabric strip which is spirally wound forming a helix, and (2) a second reinforcement layer, wherein the second reinforcement layer is formed of a second fabric strip which is spirally wound forming a helix, wherein the second fabric strip is of essentially the same width as the first fabric strip, wherein the second fabric strip is parallel to the first fabric strip, wherein the second fabric strip is offset from the first fabric strip, wherein an elastomeric layer is situated between the first fabric layer and the second fabric layer, or the first fabric layer and the second fabric layer are bonded together by a bonding layer; wherein the first fabric strip of the first reinforcement layer has a helix angle of which is within the range of 0.05° to 15°; and wherein the endless belt is spliceless.

2. The endless belt as specified in claim 1 wherein the second fabric strip is offset from the first fabric strip by at least 2 percent the width of the first fabric strip.

3. The endless belt as specified in claim 1 wherein the second fabric strip is offset from the first fabric strip by at least 20 percent to 80 percent of the width of the first fabric strip.

4. The endless belt as specified in claim 1 wherein the second fabric strip is offset from the first fabric strip by at least 30 percent to 70 percent of the width of the first fabric strip.

5. The endless belt as specified in claim 1 wherein the second fabric strip is offset from the first fabric strip by at least 40 percent to 60 percent of the width of the first fabric strip.

6. The endless belt as specified in claim 1 wherein the belt includes a third reinforcement layer having fabric strips which are wound at an angle opposite the angle of the first and second fabric strips.

7. The endless belt as specified in claim 1 wherein the first fabric strip of the first reinforcement layer has a helix angle of no more than 15°.

8. The endless belt as specified in claim 1 wherein the first fabric strip of the first reinforcement layer has a helix angle of no more than 10°.

9. The endless belt as specified in claim 1 wherein the first fabric strip has a width which is within the range of 0.25 inch to 12 inches.

10. The endless belt as specified in claim 1 wherein the first fabric strip has a width which is within the range of 0.5 inch to 4 inches.

11. The endless belt as specified in claim 1 wherein the first fabric strip has a width which is within the range of 1 inch to 3 inches.

12. The endless belt as specified in claim 1 wherein the first fabric strip of the first reinforcement layer has a helix angle which is within the range of 0.05° to 8°.

13. The endless belt as specified in claim 1 wherein the first fabric strip of the first reinforcement layer has a helix angle which is within the range of 0.1° to 6°.

14. An endless elastomeric belt which is comprised of (1) an elastomeric layer, (2) a first reinforcement layer, wherein the first reinforcement layer is formed of a first fabric strip which is spirally wound forming a helix, and (3) a second reinforcement layer, wherein the second reinforcement layer is formed of a second fabric strip which is spirally wound forming a helix, wherein the second fabric strip is of essentially the same width as the first fabric strip, wherein the second fabric strip is parallel to the first fabric strip, wherein the second fabric strip is offset from the first fabric strip by at least 2 percent the width of the first fabric strip, wherein an elastomeric layer is situated between the first fabric layer and the second fabric layer, or the first fabric layer and the second fabric layer are bonded together by a bonding layer; wherein the first fabric strip of the first reinforcement layer has a helix angle of which is within the range of 0.05° to 15°; and wherein the endless belt is spliceless.

15. The endless elastomeric belt as specified in claim 14 wherein the second fabric strip is offset from the first fabric strip by at least 20 percent to 80 percent of the width of the first fabric strip.

16. The endless elastomeric belt as specified in claim 15 wherein the belt includes a third reinforcement layer having fabric strips which are wound at an angle opposite the angle of the first and second fabric strips.

17. The endless elastomeric belt as specified in claim 16 wherein the first fabric strip of the first reinforcement layer has a helix angle of no more than 10°.

18. The endless elastomeric belt as specified in claim 16 wherein the first fabric strip has a width which is within the range of 0.5 inch to 4 inches.

19. The endless elastomeric belt as specified in claim 16 wherein the first fabric strip of the first reinforcement layer has a helix angle which is within the range of 0.1° to 6°.

20. An endless elastomeric belt which is comprised of (1) a first elastomeric layer which forms the bottom surface of the belt, (2) a second elastomeric layer which forms the top surface of the belt, (3) a first reinforcement layer which is situated between the first elastomeric layer and the second elastomeric layer, wherein the first reinforcement layer is formed of a first fabric strip which is spirally wound forming a helix, and (4) a second reinforcement layer which is situated between the first elastomeric layer and the second elastomeric layer, wherein the second reinforcement layer is formed of a second fabric strip which is spirally wound forming a helix, wherein the second fabric strip is of essentially the same width as the first fabric strip, wherein the second fabric strip is parallel to the first fabric strip, wherein the second fabric strip is offset from the first fabric strip by at least 2 percent the width of the first fabric strip, wherein an elastomeric layer is situated between the first fabric layer and the second fabric layer, or the first fabric layer and the second fabric layer are bonded together by a bonding layer; wherein the first fabric strip of the first reinforcement layer has a helix angle of which is within the range of 0.05° to 15°; and wherein the endless belt is spliceless.

* * * * *